Sept. 6, 1932.     P. O'DWYER     1,875,647
VEHICLE
Filed May 18, 1931     2 Sheets-Sheet 1
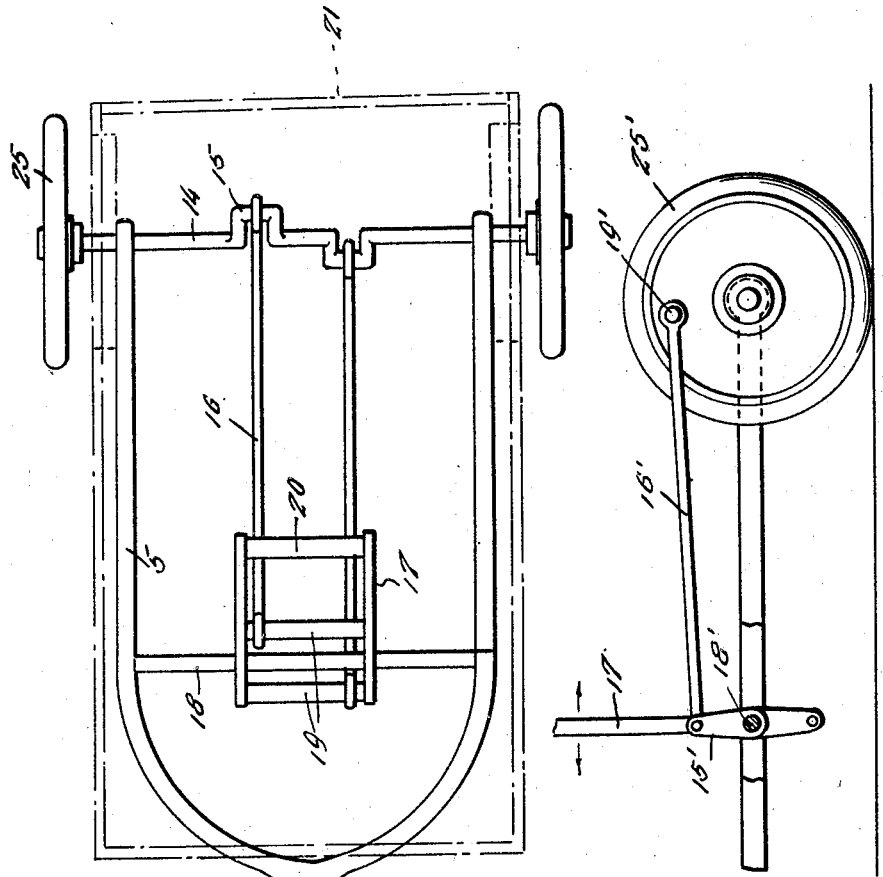
Inventor
Philip O'Dwyer
By Clarence A. O'Brien
Attorney

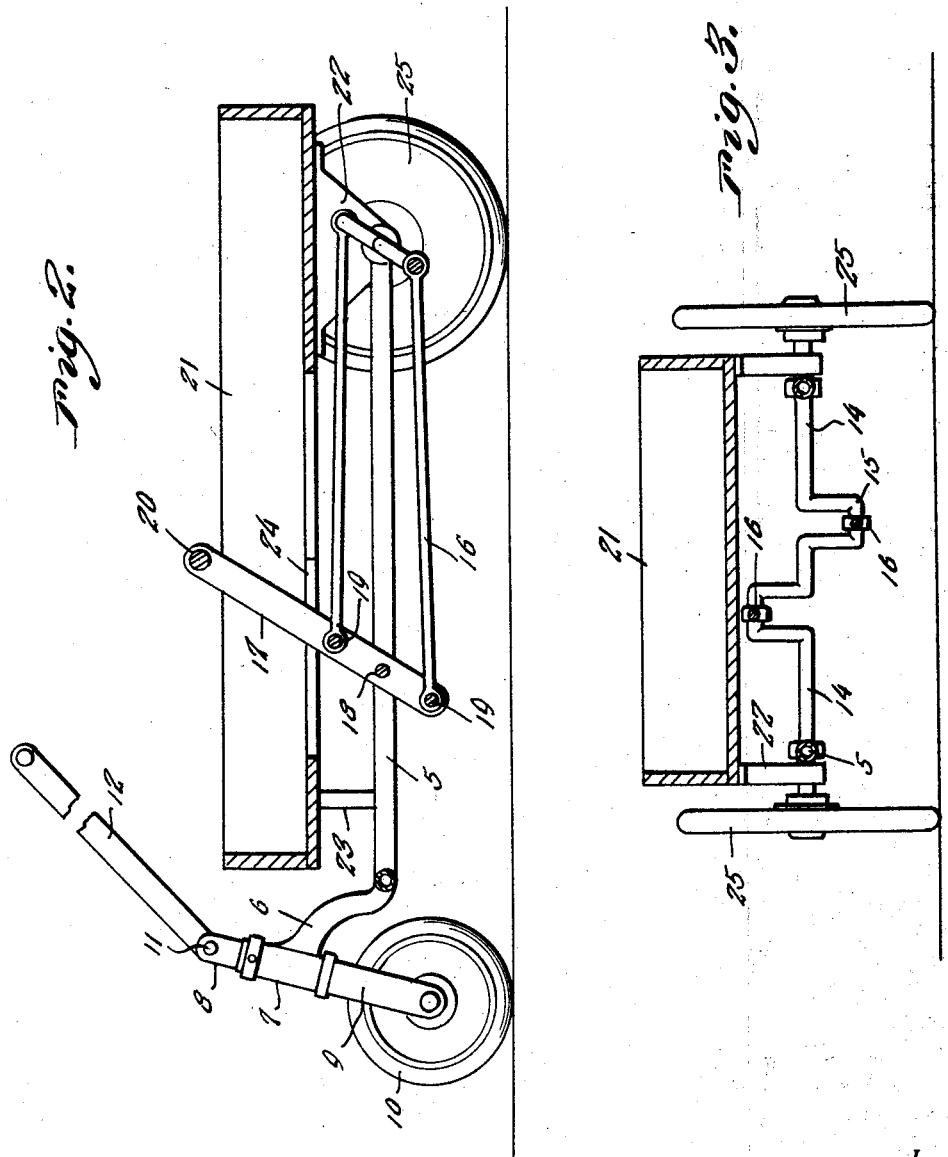

Patented Sept. 6, 1932

1,875,647

UNITED STATES PATENT OFFICE

PHILIP O'DWYER, OF DETROIT, MICHIGAN

VEHICLE

Application filed May 18, 1931. Serial No. 538,349.

The present invention relates generally to vehicles and particularly to wagons, scooters and the like such as are used by children but the principles of the invention are not confined or limited to the specific vehicles named.

The prime object of the invention resides in the provision of a novel propelling apparatus for the vehicle which is easy to operate and thoroughly efficient and reliable in operation.

Another very important object of the invention resides in the provision of a vehicle of this nature which is exceedingly simple in its construction, strong and durable, compact and convenient in its arrangement of parts, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of a vehicle embodying the features of my invention with the body removed.

Figure 2 is a vertical longitudinal section therethrough.

Figure 3 is a vertical transverse section therethrough.

Figure 4 is a transverse sectional view showing another embodiment of the invention.

Referring to the drawings in detail and particularly to Figures 1 to 3 inclusive it will be seen that numeral 5 denotes a U-shaped frame from the center of the bight portion of which curves upwardly and forwardly a bracket arm 6 terminating in an upwardly and rearwardly inclined bearing sleeve 7 through which a shank 8 is journalled, the bottom end of which is in the form of a fork 9 in which front wheel 10 is journalled.

On the shank 8 is pivotally mounted as at 11 a steering handle 12.

A crank shaft 14 is journalled through the extremities of the frame 5 and has a pair of intermediately disposed crank portions 15 extending in opposite direction from each other and to which are connected rods 16. A pair of levers 17 are rockable on a rod 18 across the forward intermediate portion of the frame 5 and have a pair of rods 19 mounted therebetween one above and one below the rod 18 and equidistant therefrom to which the forward ends of the connecting rods are engaged so that when these levers are oscillated the vehicle may be propelled either forwardly or rearwardly as will be quite apparent. A handle bar 20 is mounted between the upper ends of the levers 17.

Numeral 21 denotes a box like wagon body mounted on blocks 22 through which the axle crank shaft 14 is journalled and a block or the like 23 mounted on the forward portion of the frame 5. The bottom of the body 21 has a slot or slots to accommodate the lever 17 as is indicated at 24. Rear wheels 25 are mounted on the extremities of the axle crank shaft 14.

In Figure 4 I have indicated another embodiment of the invention wherein on the rod 18' there is mounted oppositely disposed cranks 15', the rod 18' being rockably mounted in the frame 5 and oscillatable by a lever 17' fixed thereto. Connecting rods 16' are engaged with the cranks 15' and are engaged off center as at 19' with the rear wheels 25'.

It is thought that the construction, operation, utility and advantages of this invention will now be quite apparent to those skilled in this art without a more detailed description thereof.

The present embodiments of the invention have been described merely for the purposes of exemplification since in actual practice they attain the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In a vehicle of the class described, a frame, an axle carried by the frame and having a pair of longitudinally spaced oppositely directed cranks, wheels mounted on the axle, links extending forwardly from said cranks, an actuating lever having a pair of laterally spaced guide members and cross bars connecting the guide members, the forward portions of said links being connected to said cross bars, and a cross rod carried by said frame and extending through the guide members of said lever, at a point between and in spaced parallel relation to said cross bars, said lever being provided at the upper portion thereof with a cross member constituting a handle and driving said guide members.

In testimony whereof I affix my signature.

PHILIP O'DWYER.